US008368994B2

(12) United States Patent  (10) Patent No.: US 8,368,994 B2
Bloom  (45) Date of Patent: Feb. 5, 2013

(54) SCANNED, ONE-DIMENSIONAL, PHASED-ARRAY DISPLAY SYSTEM

(75) Inventor: David M. Bloom, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 547 days.

(21) Appl. No.: 12/164,030

(22) Filed: Jun. 28, 2008

(65) Prior Publication Data

US 2009/0323169 A1    Dec. 31, 2009

(51) Int. Cl.
G02F 1/01       (2006.01)
G02B 26/02      (2006.01)
(52) U.S. Cl. .................... 359/279; 359/276; 359/231
(58) Field of Classification Search .......... 359/231, 359/291, 292, 293, 295, 298, 223, 224, 320, 359/324, 566, 572, 573, 276, 279, 290, 571
See application file for complete search history.

(56) References Cited

U.S. PATENT DOCUMENTS 5,589,955 A * 12/1996 Amako et al. .................... 359/9
6,268,952 B1    7/2001 Godil
6,707,591 B2 *  3/2004 Amm ............................. 359/290
6,900,827 B2 *  5/2005 Taniguchi ..................... 347/255
7,046,410 B2    5/2006 Deutsch
7,354,167 B2 *  4/2008 Cho et al. ...................... 359/850
7,420,177 B2 *  9/2008 Williams et al. ......... 250/370.08
2009/0073824 A1* 3/2009 Kurozuka et al. .......... 369/44.23

OTHER PUBLICATIONS

L B. Lesem et al., "The Kinoform: A New Wavefront Reconstruction Device", IBM J. Res. Develop., Mar. 1969, p. 150-155.
J. R. Fienup, "Reconstruction of an object from the modulus of its Fourier transform", Optics Letters, Jul. 1978, p. 27-29.
A. Georgiou, et al. "Aspects of hologram calculation for video frames", Journal of Optics A: Pure and Applied Optics, Feb. 2008, p. 035302 (9pp).

* cited by examiner

Primary Examiner — Tuyen Tra
(74) Attorney, Agent, or Firm — NUPAT, LLC; Morrison Ulman

(57) ABSTRACT

A scanned, one-dimensional, phased-array display system combines imaging optics on one axis with Fourier transform optics on another. The display offers the energy efficiency and fault tolerance of phase modulator-based displays, and the compactness, flexibility and speed of optical MEMS. Also described is a mechanism to introduce amplitude variations on the Fourier axis if needed to compensate for image artifacts.

17 Claims, 6 Drawing Sheets

A

B

SCANNED, ONE-DIMENSIONAL, PHASED-ARRAY DISPLAY SYSTEM

TECHNICAL FIELD

The disclosure is generally related to the fields of optical display systems, optical micro-electromechanical systems (MEMS) devices, optical phased arrays and kinoforms.

BACKGROUND

Projection display systems based on phase modulators are under development as alternatives to displays based on amplitude modulators. For example, when a liquid crystal on silicon (LCOS) phase modulator is programmed with a kinoform, the corresponding real image is obtained by illuminating the modulator with a laser.

Displays based on phase modulators have better optical efficiency than those using amplitude modulators such as conventional liquid crystals, digital mirror devices or MEMS light valves. A phase modulator steers input light to a projection screen while an amplitude modulator discards light to create dark states. Typical video content is only about 25% as bright as the maximum brightness state; e.g. an all white image. A display system using a phase modulator for video therefore requires only one quarter the optical input power of a corresponding system using an amplitude modulator.

Compared to amplitude modulators, phase modulators are also more tolerant to pixel failures, lens aberrations and variations in beam quality from light sources. However, two-dimensional phase modulators for video depend on high-speed computing to calculate their input signals. Their success in video projection "is directly linked to the availability of fast two-dimensional FFT processors," according to Georgiou et al. (Journal of Optics A: Pure and Applied Optics 10 (2008) 035302). Phase modulators may also generate unwanted image artifacts if they are unable to create all phases from zero through $2\pi$.

A one-dimensional phase modulator for a light steering optical switch was described by Bloom and Godil (U.S. Pat. No. 6,268,952) as a way to "emulate a continuous mirror tilted by using discrete reflective segments." Their phase modulator couples light from fiber optic inputs to fiber optic outputs. The light steering optical switch takes advantage of reflective MEMS ribbon technology which can produce switching speeds as fast as 20 nanoseconds.

Despite conventional thinking that a two-dimensional phase modulator is required to create a two-dimensional image, what is needed is a display system based on a one-dimensional phase modulator. Such a system should make use of the high switching speeds available with some optical MEMS to provide an escape from the limitations of current two-dimensional phase modulator based display systems while retaining their robustness and optical efficiency.

BRIEF DESCRIPTION OF THE DRAWINGS

The drawings are schematic for clarity.

DETAILED DESCRIPTION

Figure 1:
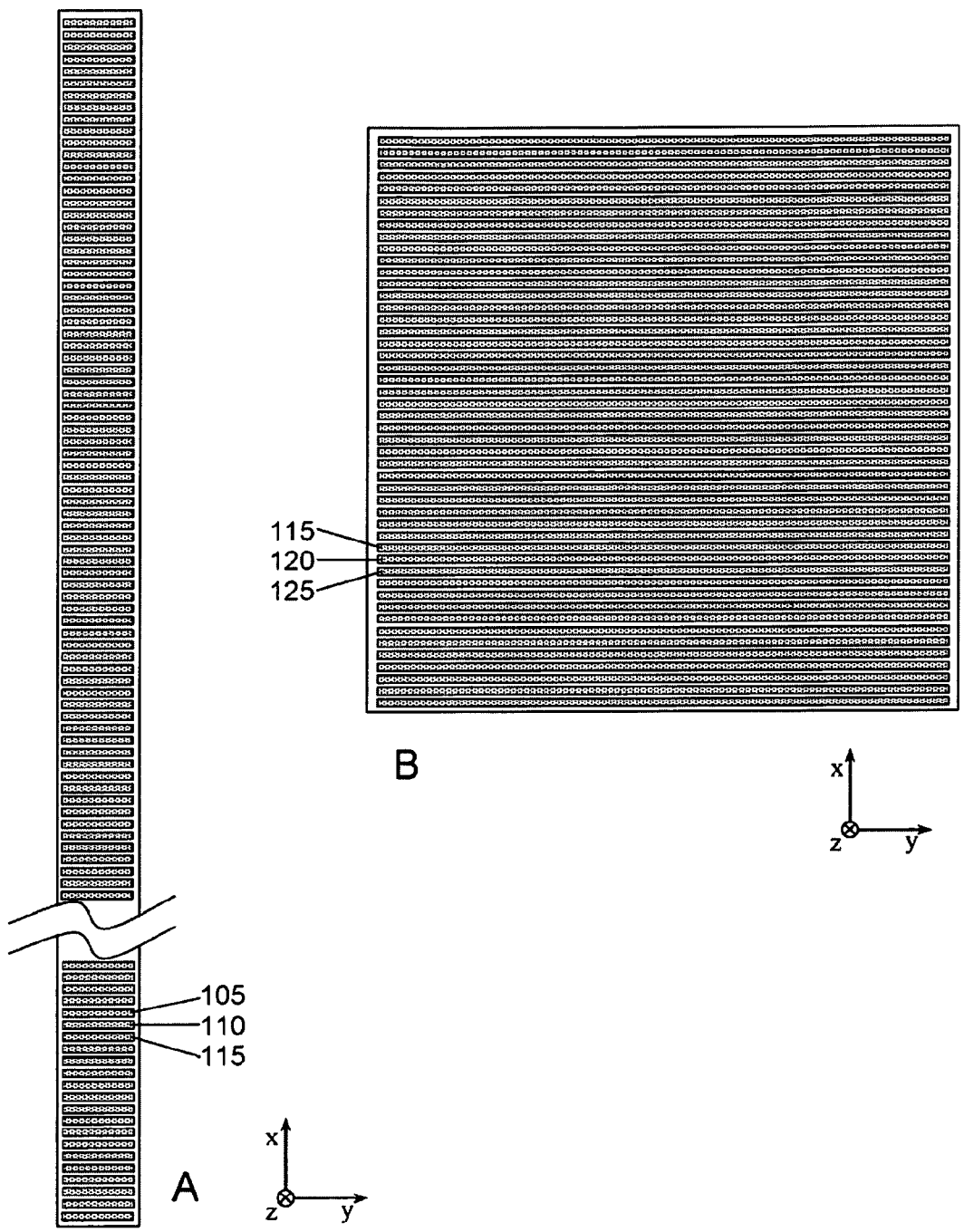
FIGS. 1A and 1B show 1-D mirror arrays.

A scanned, one-dimensional, phased-array display system is a hybrid display combining imaging optics on one axis with Fourier transform optics on another. This new hybrid display offers the energy efficiency and fault tolerance of phase modulator-based displays, and the compactness, flexibility and speed of optical MEMS. It also includes a mechanism to introduce amplitude variations on the Fourier axis if needed to compensate for image artifacts.

Parts of the display described here are related conceptually to a kinoform. As first described by Lesem et al., "A kinoform operates only on the phase of an incident wave, being based on the assumption that only the phase information in a scattered wavefront is required for the construction of an image of the scattering object. The amplitude of the wavefront in the kinoform plane is assumed constant. The kinoform may therefore be thought of as a complex lens which transforms the known wavefront incident on it into the wavefront needed to form the desired image." (IBM Journal of Research and Development, March 1969, p. 150.) The system described here however resembles the kinoform in only one dimension or axis; the orthogonal dimension or axis relies on simple imaging.

A scanned, one-dimensional, phased-array display creates line images using Fourier transform techniques and scans those line images in the direction perpendicular to the line to create two-dimensional images. A line image could be created by illuminating its Fourier transform with a laser. However, the one-dimensional, phased-array display operates on phase, not amplitude, and therefore does not reproduce the amplitude variations of a true Fourier transform. (Ways to adjust amplitude on the Fourier axis are described later.)

Only squared magnitudes, rather than amplitudes and phases, are perceived in an image. Light forming an image may have arbitrary phase and the phased-array display uses this degree of freedom in the image plane to satisfy the constraint of unit amplitude in the Fourier plane. Therefore, instead of presenting the Fourier transform of a desired line image, the phased-array display presents a kinoform.

The one-dimensional kinoform is created by a one-dimensional array of mirrors that can be set to varying heights to reflect light normally incident upon them. When two mirrors set at different heights, the phase of light reflected by the mirrors differs by $2kz$ where z is the height difference, k equals $2\pi/\lambda$, and $\lambda$ is the wavelength of the light. The array of mirrors may contain hundreds or thousands of elements. If just one of the mirrors is set at a different height from the others, the resulting image, i.e. the Fourier transform of one element out of phase, is a line. Conversely, if all the mirrors lie in one plane, the resulting image is a spot. Finally, if the mirrors alternate height to create a grating pattern, spots are formed at a maximum angle away from an axis perpendicular to the mirror surfaces. In general, phase information represented in the one-dimensional array as mirror heights causes light to spread out, forming a line image parallel to the long axis of the array. Two-dimensional images are formed by scanning the line image in the perpendicular direction.

The one-dimensional kinoform or phased array is robust in the face of single element failures in the array. If one element fails, the error created by that element is spread over the entire extent of the image. In other words, a single element failure leads to a slight degradation in contrast, but does not appear as a streak in the image as can happen with an amplitude modulator. Furthermore, the phased array display may be illuminated by a laser beam with a Gaussian, or other non-uniform, transverse intensity profile. It does not require constant, or "top-hat", illumination intensity along the length of the array. Finally, as mentioned by Lesem, the kinoform unit amplitude phase modulator may be thought of as a complex, arbitrary lens. A quadratic phase variation along the length of the array leads to a simple lens; Fresnel lenses may be created from phase ramps of appropriate dimensions. The phased array may therefore be used to compensate for lens aberrations in an optical system.

Scanned one-dimensional modulators must be able to switch state fast enough for a two-dimensional image to be formed from line images. If a two-dimensional image contains m line images, for example, a one-dimensional modulator must switch between each of the m lines during the time available to present the entire image. Fortunately, some optical MEMS modulators, such as ribbon modulators, switch state in as little as 20 nanoseconds.

FIGS. 1A and 1B show 1-D mirror arrays. The mirror arrays of FIGS. 1A and 1B differ in their aspect ratios; i.e. the ratio of the length of an array to its width. FIG. 1A shows a narrow stripe array of mirrors. The array is much longer (in the x direction) than it is wide (in the y direction); i.e. it has an aspect ratio greater than 10. The array contains mirror elements such as mirrors 105, 110 and 115 which are just a few of hundreds or thousands of mirror elements found in a typical array. FIG. 1B shows a wide array of mirrors. In this case the length (x direction) and width (y direction) of the array are approximately equal; i.e. the aspect ratio is less than 10. Mirror elements 115, 120 and 125 are just a few of hundreds or thousands of mirror elements found in a typical array. Each of the mirror elements in the arrays of FIGS. 1A and 1B is rapidly adjustable in height; i.e. they can be moved quickly to different positions along the z direction, into and out of the page.

Mirror arrays like those shown in FIGS. 1A and 1B may be constructed using micro-electromechanical systems (MEMS) microfabrication techniques. Mirror widths (x direction) may range from approximately 1 to 10 µm while lengths (y direction) may be approximately 100 to 10,000 µm for narrow or wide arrays respectively. (These dimensions are approximate and may vary by as much as a factor of five.) Movement of the mirrors in the z direction by one half the wavelength of light, or approximately 0.25 µm, is required to produce phase shifts of up to $2\pi$. (Movement of as much as three-quarters of a wavelength may be needed for amplitude correction techniques discussed later.) Microfabrication techniques appropriate for making narrow stripe arrays of mirrors may be based on modification of processes used to make mirrors for grating light modulators or polarization light modulators. An array of wide mirrors has been described, for example, in connection with a diffractive optical processor (U.S. Pat. No. 7,046,410).

Narrow stripe arrays like the one shown in FIG. 1A are used to impart a phase profile on beams of light that are tightly focused in the y direction. Wide arrays like the one shown in FIG. 1B impart a phase profile on beams whose transverse profile has roughly equal x and y dimensions. A mirror in a wide array must remain flat (i.e. constant z) over the entire mirror surface while it moves as most of the mirror is illuminated. In a narrow array, however, the illuminated part of a mirror is near its center so some bowing may be acceptable.

Figure 2:
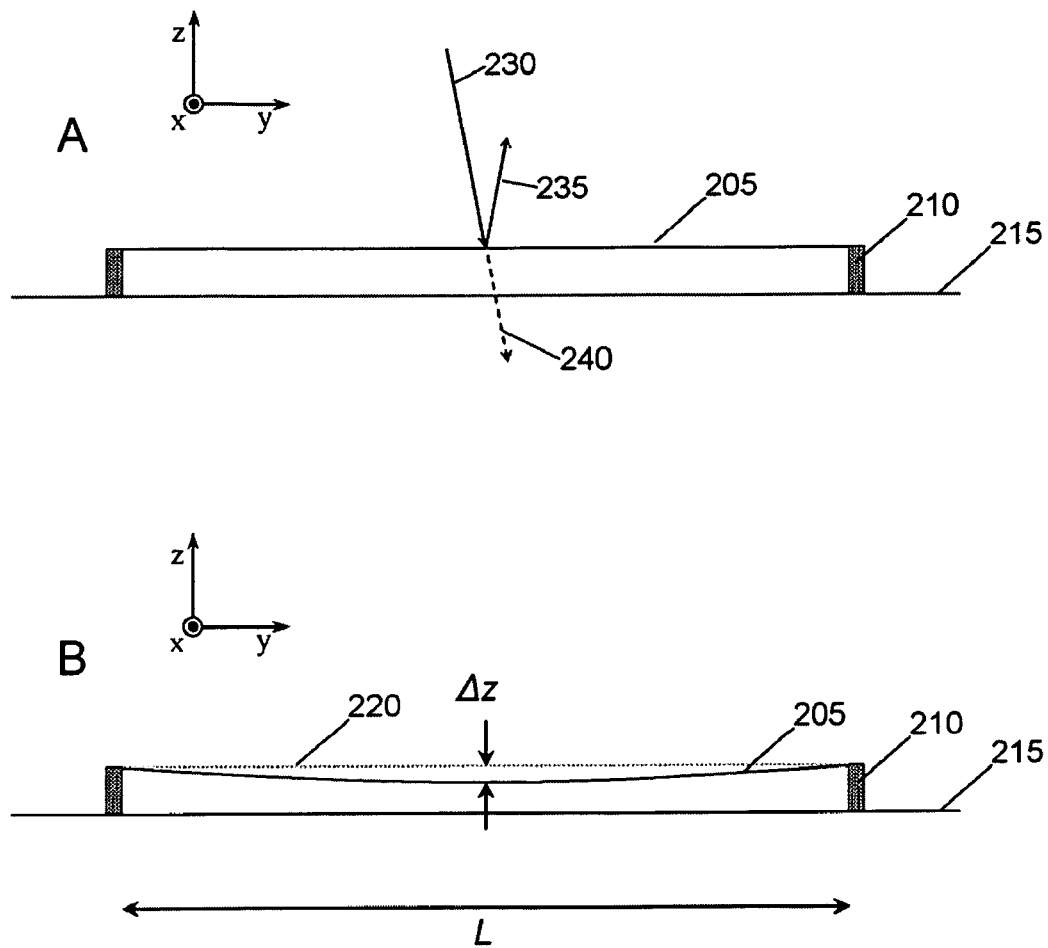
FIGS. 2A and 2B show a MEMS ribbon device.

FIGS. 2A and 2B show a MEMS ribbon device that may be used to form mirror elements in a narrow stripe array such as that illustrated in FIG. 1A. In FIG. 2A, MEMS ribbon 205 is suspended by supports 210 over a substrate 215. Application of a voltage between ribbon 205 and substrate 215 causes the ribbon to bend toward the substrate as shown in FIG. 2B in which the ribbon deflection at the center is $\Delta z$. A device like that shown in FIG. 2 using aluminum coated nitride ribbons about 200 µm long and 5 µm wide can switch from $\Delta z=0$ to $\Delta z=0.25$ µm in tens of nanoseconds. Although the ribbon is slightly bowed, its flatness is acceptable for some applications over a distance of as much as L/2 centered in the middle of the ribbon where L is the length of the ribbon overall. The greater the requirement for flatness, the smaller the extent of ribbon 205 away from the center of the ribbon is useable.

Figure 3:
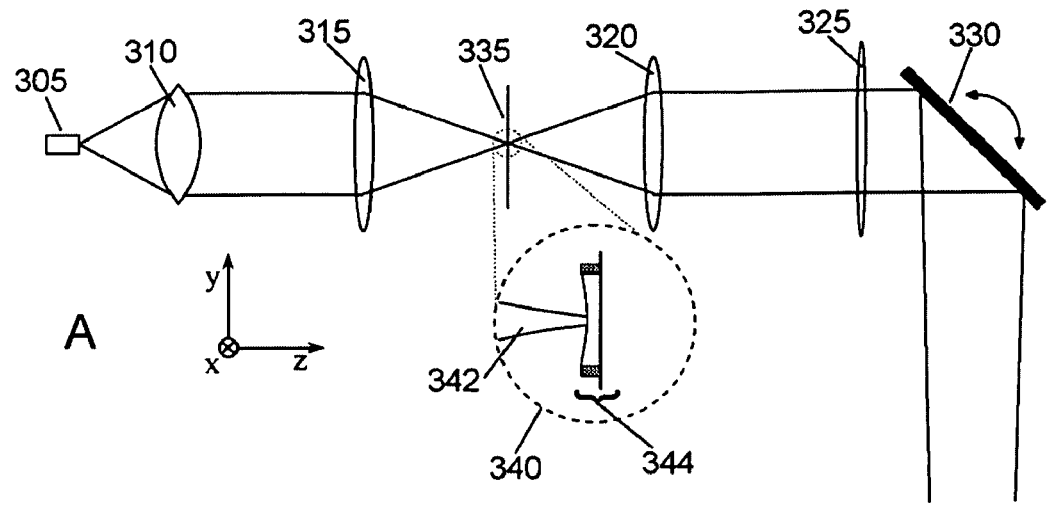
FIGS. 3A and 3B show a scanned, one-dimensional, phased-array display system.
Figure 3:
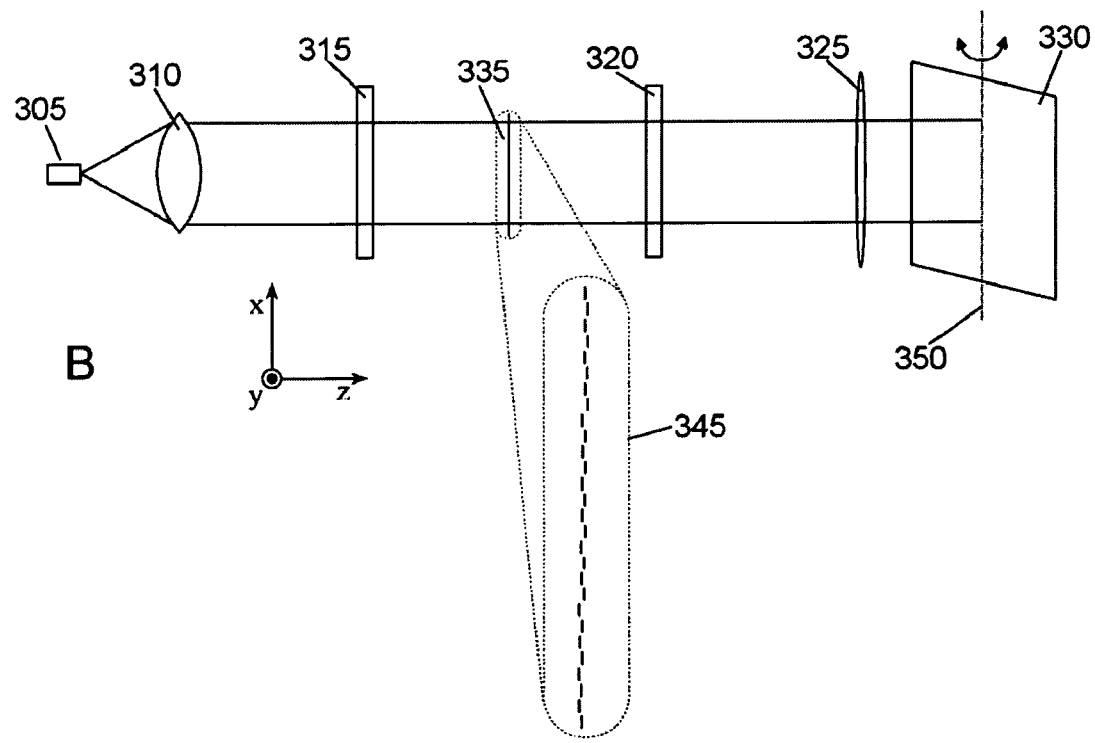
Figure 5:
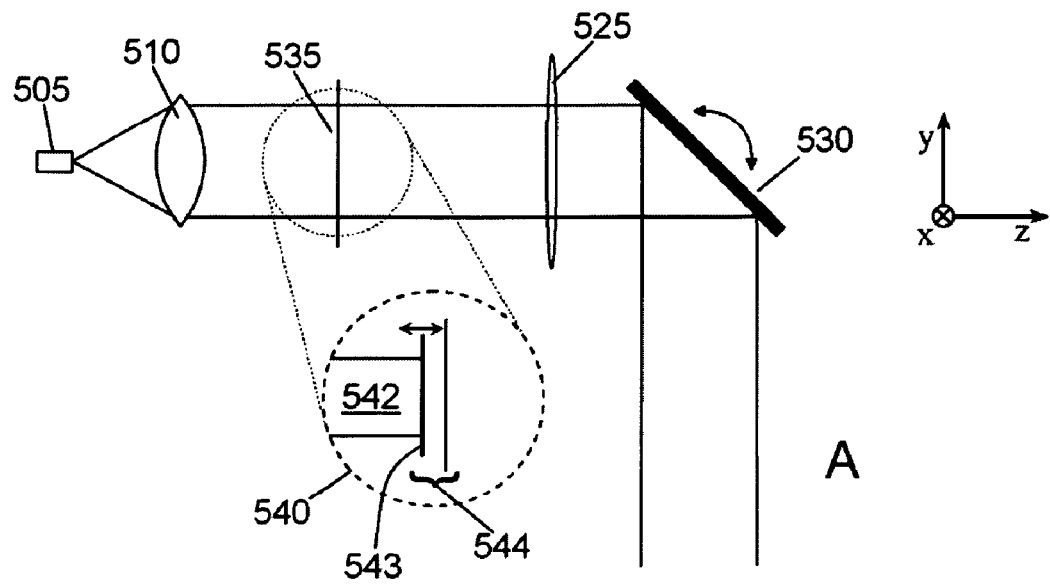
FIGS. 5A and 5B show a scanned, one-dimensional, phased-array display system incorporating wide mirrors.
Figure 5:
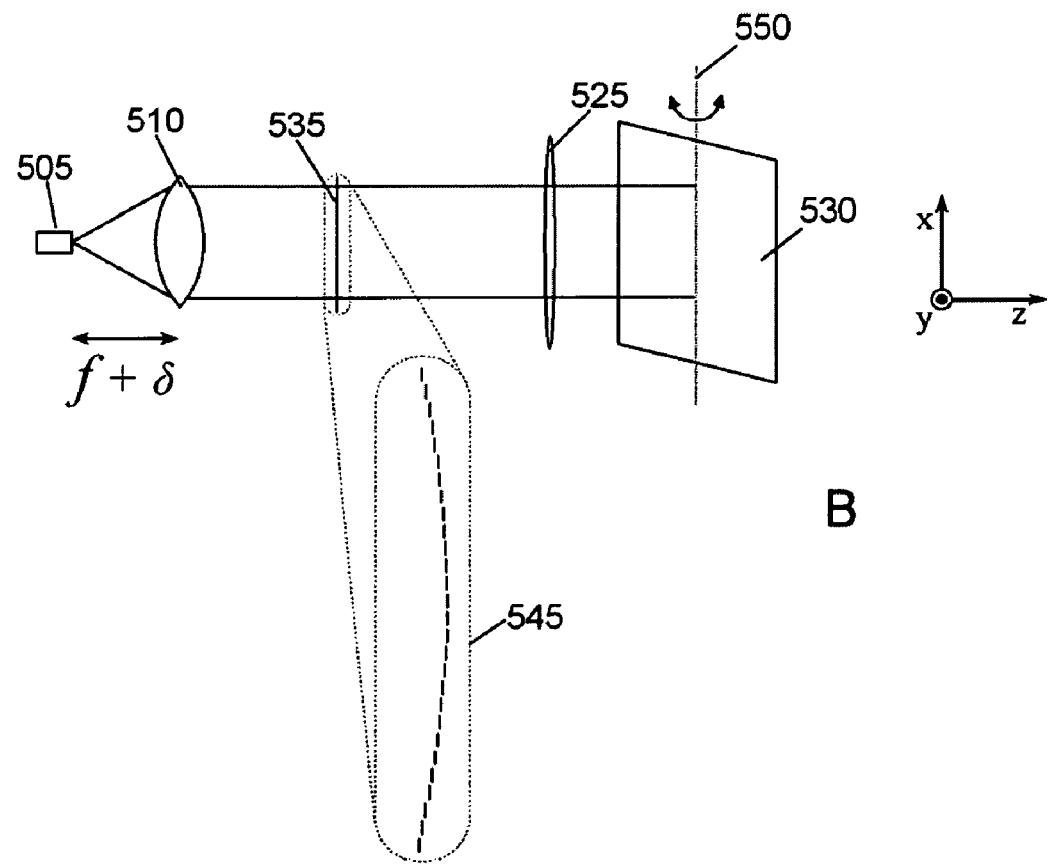

In FIG. 2A a ray of light 230 is shown incident upon ribbon 205. A reflected ray 235 is shown leaving the ribbon. Also illustrated with a dotted line is virtual ray 240. For drawing convenience, the optical systems of FIGS. 3 and 5 are shown in unfolded views where light that is reflected from a mirror is drawn as continuing through the mirror much like ray 240. Said another way, one-dimensional phased arrays shown in FIGS. 3 and 5 are drawn in transmission rather than reflection. Furthermore, although MEMS mirrors are described here as suitable for one-dimensional, phased-array display systems, transmissive phase modulation techniques would work in principle.

FIGS. 3A and 3B show a scanned, one-dimensional, phased-array display system. (The scan mirror and projection screen of the system are shown in FIGS. 4A and 4B.) The system of FIGS. 3A and 3B uses a stripe mirror array, such as the array of FIG. 1A, which may be realized by an array of MEMS ribbons such as those illustrated in FIGS. 2A and 2B. The xyz axes in FIGS. 3A and 3B make clear that the point of view of FIG. 3B is one that is rotated 90 degrees around the z axis compared to that of FIG. 3A. The optical system shown in FIGS. 3A and 3B makes use of a one-dimensional phased array on the x axis and conventional imaging on the y axis.

In FIG. 3 laser 305 emits a light beam that is collimated by lens 310 placed one focal length away from the laser. Cylinder lens 315 focuses the beam on one-dimensional phased array 335. The reflected beam is then collimated by cylinder lens 320. Even though phased array 335 is a reflective device, the optical system is drawn in transmission for simplicity as explained earlier. Lenses 315 and 320 are placed one focal length away from phased array 335 and could even be the same lens in an embodiment of the system. Furthermore, lenses 310 and/or 315 may be modified or be replaced by an anamorphic imaging system if the transverse intensity profile of the beam emitted by laser 305 lacks circular symmetry.

(In FIG. 3 laser 305 (and in FIG. 5 laser 505) is drawn as emitting a rapidly diverging beam, as is typical for a diode laser. However, other types of lasers emit nearly collimated beams. Therefore lens 310 (or 510) is optional and other optics can be used. It may even be useful to form a waist before expanding a laser beam and collimating it.)

Figure 4:
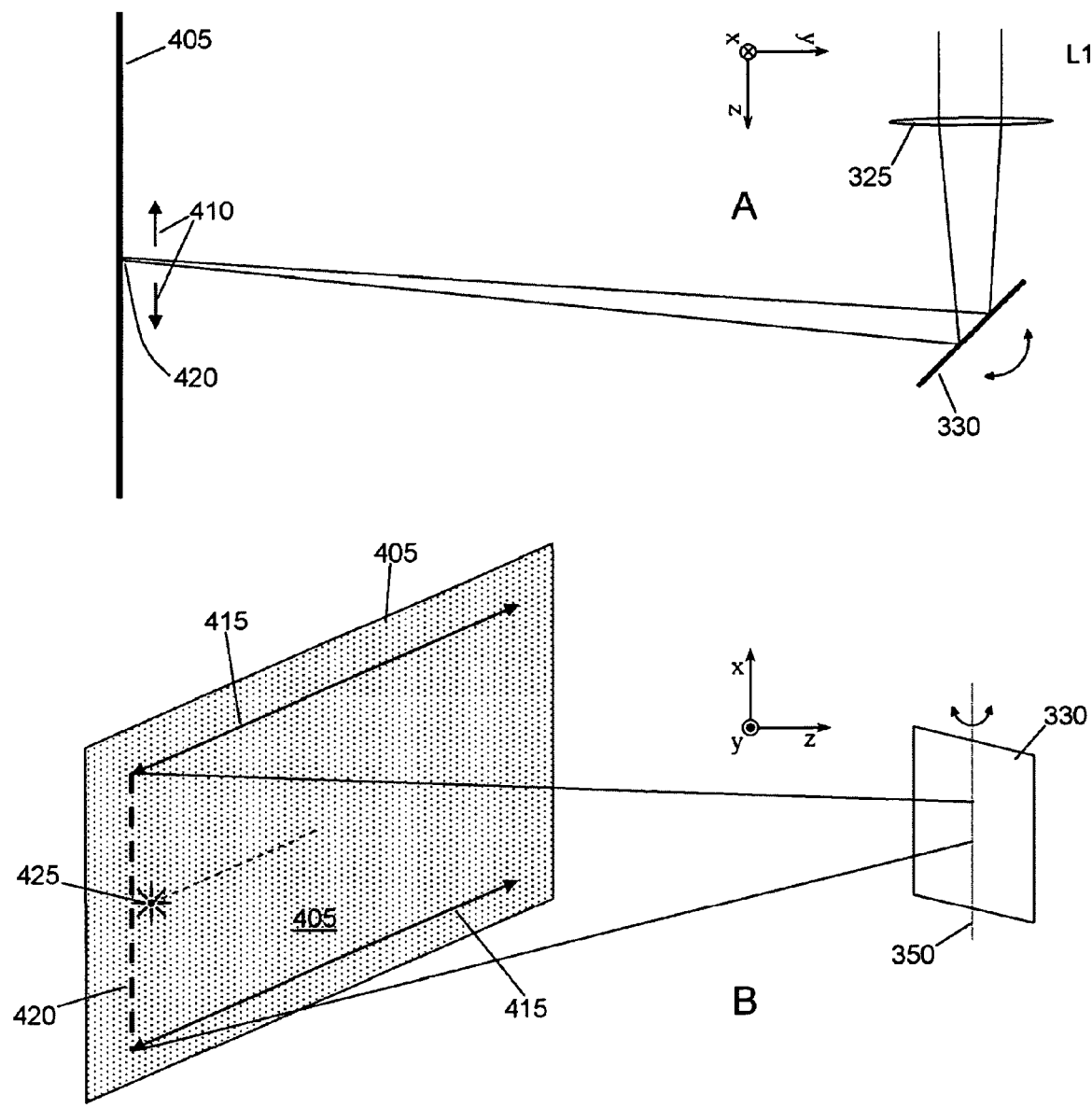
FIGS. 4A and 4B show the scan mirror and projection screen of the system of FIGS. 3A and 3B.

Lens 325 focuses the beam at a screen as shown in FIG. 4. (If lens 325 is omitted, the system focuses at infinity.) Scan mirror 330 scans a line image to form a two-dimensional image on a screen. Insets 340 and 345 show enlarged views of phased array 335. Scan mirror 330 rotates around axis 350. Lenses 315 and 320 are drawn with curved surfaces in FIG. 3A but flat surfaces in FIG. 3B to show that they are cylinder lenses that focus light in the y-z plane, but not the x-z plane. Inset 340 shows a close up of an array (such as that shown in FIG. 1A) as viewed in the x direction. Inset 345 shows the same array as seen in the y direction. Inset 340 shows a light beam 342 brought to a focus at the center of a ribbon device 344 like that of FIG. 2. Inset 345 shows an end view of the centers of several ribbons (out of hundreds or thousands) in the array.

In the y-z plane (FIG. 3A), the system images the point (ray optics view) or waist (Gaussian optics view) formed at phased array 335 to a point or waist at a distant screen. In the x-z plane (FIG. 3B) however, the one-dimensional phased array causes light to spread out, forming a line image parallel to the long (x) axis of the array.

Figure 6:
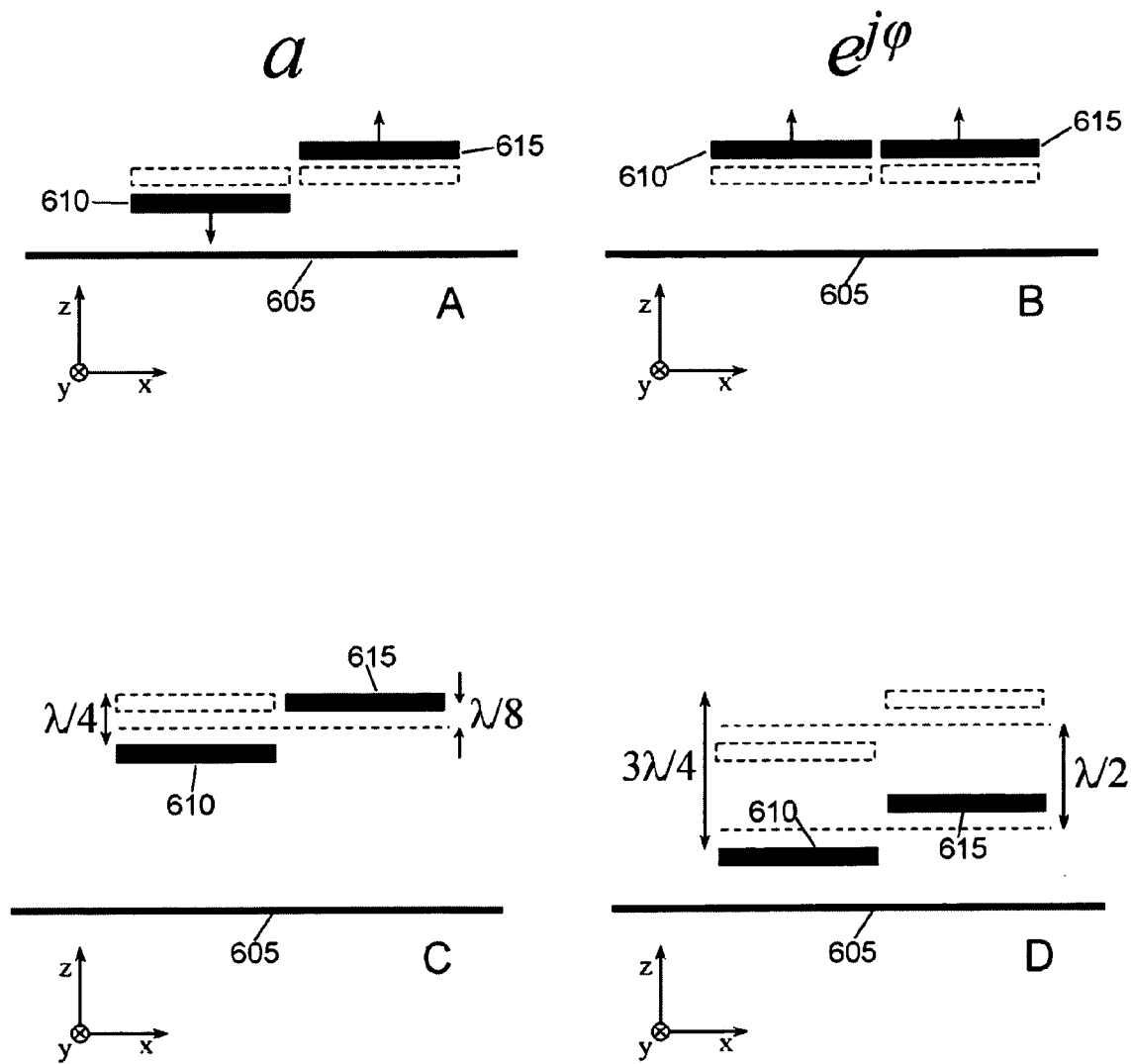
FIGS. 6A-6D show how mirror pairs may be used to modulate amplitude as well as phase in the systems of FIGS. 3 and 5.

FIGS. 4A and 4B show the scan mirror and projection screen of the system of FIGS. 3A and 3B. In the figures, light from the system shown in FIG. 3 forms a line image 420 on projection screen 405. The line image is scanned by scan mirror 330 such that it paints a two dimensional image by moving across screen 405 as indicated by arrows 410 and 415. Spot 425 is a potential artifact that could occur in certain cases; systems and methods to remove it are discussed in connection with FIG. 6 below.

Considering FIGS. 3 and 4 it may now be seen that when the kinoform of a desired line image is presented by phased array 335, the real image appears at screen 405. Scanning a succession of such line images across the screen results in the appearance of a two-dimensional image. The resolution of the two-dimensional image is determined in the scanned direction by how many line images can be formed within the time duration of one video frame. This is a function of the speed at which the phased array changes its configuration. In the direction parallel to the length of the phased array (i.e. the x direction) the resolution is proportional to the number of phased array elements. As an example, a one-dimensional array of mirrors made from MEMS ribbons may contain hundreds, thousands, or even tens of thousands of elements.

The scanned one-dimensional, phased-array display system uses essentially all of the light output by the laser source to form an image on a screen. The integrated intensity, or energy, in lines making up a two-dimensional image varies from line to line. Therefore, laser 305 is modulated such that its output matches the energy required in each line. Diode lasers, for example, may be modulated rapidly to meet this requirement.

FIGS. 5A and 5B show a scanned, one-dimensional, phased-array display system incorporating wide mirrors. The system is similar to that of FIG. 3; however, cylinder lenses 315, 320 are omitted. The scan mirror and projection screen shown in FIG. 4 may be used with the system of FIG. 5. The wide mirrors may be realized by a two-layer MEMS ribbon system similar to that disclosed in U.S. Pat. No. 7,046,410, or by any other mirror array similar to that shown in FIG. 1B where the mirrors move in the z direction while maintaining flatness.

In FIG. 5 laser 505 emits a light beam that is collimated by lens 510 placed approximately one focal length away from the laser. The beam is then incident upon phased array 535 before being focused at a distant screen by lens 525. Absent lens 525, the system focuses at infinity. Scan mirror 530 rotates around axis 550 to scan a line image to form a two-dimensional image.

Inset 540 shows a close up of an array (such as that shown in FIG. 1B) as viewed in the x direction. Inset 545 shows the same array as seen in the y direction. Inset 540 shows a light beam 542 shining on most of the width of mirrors 543 in an array such as that shown in FIG. 1B. Inset 545 shows an end view of several ribbons (out of hundreds or thousands) in the array.

Lens 525 may be included to focus the output of the display system at a screen in a manner similar to that described in connection with FIGS. 3 and 4. However, the same effect may be accomplished in different ways using the system of FIG. 5. First of all, if lens 510 is placed one focal length from laser 505, then it collimates the laser output. If lens 510 is located farther than one focal length away from the laser, however, the beam will form a waist according to $1/d_1 + 1/d_2 = 1/f$ where $d_1$ and $d_2$ are the distance from the lens to the laser and from the lens to the waist. Alternatively, a quadratic phase variation (which may be added to an image kinoform) presented by phased array 535 will also focus the beam. Analogs of Fresnel lenses can be created by phase modulator 535 to achieve shorter focal lengths. Any of these techniques may be used separately or in combination with one another to focus the output of the display system. The focusing properties of the phased array may also be used to compensate for lens aberrations in the system as needed.

When the mirrors in a one-dimensional phased-array are wide, i.e. as wide as the collimated beam they are meant to phase modulate, there is no need for the cylinder optics of FIG. 3. Furthermore, when lens 525 is not included, phased array 535 may be mounted directly on a scanning mechanism so that an external scan mirror, such as mirror 530, is also no longer necessary. Since there is no theoretical constraint as to how close lens 510 and array 535 can be, a very compact system can be made.

Let us now return to FIG. 4 and spot 425. An artifact, such as spot 425, will appear at the center of a line image (and as a streak when scanned) if the elements of phased array 335 (or 535) are unable to produce all phases in the range zero to $2\pi$. The inaccessible range of phases represents a constant phase in the kinoform plane which appears as a point in the image plane. To avoid this problem, mirrors in the phased array may be made such that their z direction movement is equal to or greater than $\lambda/2$.

Consider also that a kinoform is not the exact Fourier transform of a desired image and therefore the image formed from a kinoform is not perfect. It is helpful to have a way to relax the unit amplitude requirement of kinoforms to improve image quality.

FIGS. 6A-6D show how mirror pairs may be used to modulate amplitude as well as phase in the systems of FIGS. 3 and 5. In the systems of FIGS. 3 and 5, each array element is used to adjust phase in the kinoform plane. However, when array elements are used in pairs, amplitude as well as phase adjustment becomes possible. Common mode movement of a mirror pair produces phase modulation while differential mode movement produced amplitude modulation.

FIGS. 6A-6D are y axis views of the center of a pair of mirrors 610, 615 from a linear array such as shown in FIG. 1A or 1B. The mirrors are suspended above a substrate 605. When the mirrors of FIG. 6 are implemented as MEMS micro mirrors (ribbon devices or wide, flat movement devices), the phase of light reflected from the mirrors is adjustable continuously. Phase adjustments may also be made in discrete steps or even be limited to binary settings.

FIG. 6A shows how differential mode movement of mirrors, one up and one down, adjusts amplitude by scattering light via diffraction. In FIG. 6B common mode movement, both up or both down, adjusts the phase of light as previously discussed. A combination of common and differential mode mirror movement allows both amplitude, $\alpha$, and phase, $\phi$, to be adjusted by one mirror pair. When the phased array modulates amplitude and phase in this way, it modulates a light beam according to a Fourier transform; i.e. it is no longer limited to kinoform or phase-only operation.

MEMS ribbon devices move toward a substrate when voltage is applied to them. They do not repel the substrate. Therefore, to achieve the effects of FIGS. 6A and 6B, mirrors can be biased by drawing them toward the substrate by a distance $\lambda/8$ as shown in FIG. 6C. Starting with both mirrors drawn $\lambda/8$ toward the substrate, movement of one toward the substrate by an additional $\lambda/8$ and the other away from the substrate by $\lambda/8$ gives the maximum required amplitude adjustment. To preserve a $2\pi$ phase range, the mirror pair must be able to be deflected an additional λ/2 toward the substrate as shown in FIG. 6D. The total deflection required is 3λ/4 toward the substrate from an unbiased position. In other words the ribbons must be suspended at least 3λ/4 away from the substrate to make full use of the amplitude and phase modulation techniques described here. For comparison, a phase only modulator using ribbons singly, need only have ribbons suspended λ/2 away from the substrate.

The scanned, one-dimensional, phased-array display system described herein combines imaging optics on one axis with Fourier transform optics on another. This new hybrid display offers the energy efficiency and fault tolerance of phase modulator-based displays, and the compactness, flexibility and speed of optical MEMS.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. An optical display comprising:
   a laser that emits light of wavelength;
   a one-dimensional phased array of mirrors, each operable for displacement by at least λ/2; and,
   a scan mirror, wherein the laser illuminates the phased array to form a line image;
   the scan mirror scans a succession of line images to form a two-dimensional image, the mirrors in the array are grouped in pairs;
   common mode operation of a pair of the mirrors provides phase modulation; and
   differential mode operation of a pair of the mirrors provides amplitude modulation, and
   the mirrors are MEMS ribbons suspended at least 3λ/4 above a substrate where λ is the wavelength of light emitted by the laser.

2. The display of claim 1 wherein the laser is modulated such that its output matches the energy required in each line image.

3. The display of claim 1 further comprising cylinder optics to focus the laser onto the phased array.

4. The display of claim 1 wherein the phased array is longer than it is wide.

5. The display of claim 1 wherein the length and width of the phased array are approximately equal.

6. An optical display comprising:
   a laser that emits light having amplitude and phase;
   Fourier optics that modulate the phase of the light using a one-dimensional kinoform on a first axis perpendicular to the direction of propagation of the light;
   imaging optics that focus the light on a second axis perpendicular to both the direction of propagation of the light and the first axis; and,
   a scan mirror,
   wherein, the Fourier optics spread light emitted by the laser into a line image along the first axis, and the line image is scanned along the second axis by the scan mirror to form a two-dimensional image.

7. The display of claim 6 wherein the Fourier optics also modulate the amplitude of the light according to using a one-dimensional Fourier transform.

8. The display of claim 6 wherein the laser is modulated such that its output matches the energy required in each line image.

9. The display of claim 6 wherein the Fourier optics comprise MEMS ribbon structures.

10. The display of claim 6 wherein the Fourier optics comprise MEMS mirrors.

11. An optical modulator comprising:
    a one-dimensional phased array of micro mirrors each suspended above a substrate by at least 3λ/4 where λ is the wavelength of light modulated by the array, the micro mirrors movable toward the substrate by an application of a voltage between each micro mirror and the substrate; wherein the micro mirrors are grouped into pairs; and
    the modulator provides amplitude modulation by common mode movement of pairs of the micro mirrors, and
    phase modulation by differential mode movement of pairs of the micro mirrors.

12. The modulator of claim 11 wherein the micro mirrors are MEMS ribbon structures.

13. An optical display comprising:
    a laser that emits light having amplitude and phase;
    Fourier optics that modulate the phase of the light using a one-dimensional kinoform on a first axis perpendicular to the direction of propagation of the light;
    imaging optics that focus the light on a second axis perpendicular to both the direction of propagation of the light and the first axis; and,
    a scan mechanism,
    wherein, the Fourier optics spread light emitted by the laser into a line image along the first axis, and the line image is scanned along the second axis by the scan mechanism to form a two-dimensional image.

14. The display of claim 13 wherein the Fourier optics also modulate the amplitude of the light using a one-dimensional Fourier transform.

15. The display of claim 13 wherein the laser is modulated such that its output matches the energy required in each line image.

16. The display of claim 13 wherein the Fourier optics comprise MEMS ribbon structures.

17. The display of claim 13 wherein the Fourier optics comprise MEMS mirrors.

* * * * *